(12) United States Patent
Shaw et al.

(10) Patent No.: US 8,778,037 B2
(45) Date of Patent: Jul. 15, 2014

(54) PROCESS OF SCRUBBING VOLATILES FROM EVAPORATOR WATER VAPOR

(75) Inventors: William A. Shaw, Milwaukee, WI (US); Mitchell Adam Edwards, Plainfield, IL (US); Jeffrey Dean Brosdal, Plainfield, IL (US)

(73) Assignee: Veolia Water Solutions & Technologies North America, Inc., Moon Township, PA (US)

( * ) Notice: Subject to any disclaimer, the term of this patent is extended or adjusted under 35 U.S.C. 154(b) by 950 days.

(21) Appl. No.: 12/786,665

(22) Filed: May 25, 2010

(65) Prior Publication Data

US 2011/0289846 A1     Dec. 1, 2011

(51) Int. Cl.
*C01B 3/36* (2006.01)

(52) U.S. Cl.
USPC ......................................................... 48/197 R

(58) Field of Classification Search
None
See application file for complete search history.

(56) References Cited

U.S. PATENT DOCUMENTS

| | | | | |
|---|---|---|---|---|
| 3,732,911 A | * | 5/1973 | Lowe et al. | 159/47.3 |
| 3,954,381 A | * | 5/1976 | Marecaux | 588/320 |
| 4,079,585 A | * | 3/1978 | Helleur | 60/781 |
| 4,188,195 A | * | 2/1980 | Jablin | 95/192 |
| 5,032,230 A | * | 7/1991 | Shepherd | 202/176 |
| 6,638,398 B1 | * | 10/2003 | Ramm-Schmidt et al. | 203/34 |
| 2009/0001020 A1 | | 1/2009 | Constantz et al. | |
| 2009/0188867 A1 | | 7/2009 | Vuong et al. | |
| 2009/0294377 A1 | * | 12/2009 | Gallot | 210/737 |
| 2010/0170453 A1 | * | 7/2010 | Betzer-Zilevitch | 122/6 R |

FOREIGN PATENT DOCUMENTS

WO     2011022812 A1     3/2011

OTHER PUBLICATIONS

International Search Report mailed Sep. 2, 2011 in re International Application No. PCT/US2011/037661.

* cited by examiner

*Primary Examiner* — Imran Akram
(74) *Attorney, Agent, or Firm* — Coats and Bennett PLLC

(57) ABSTRACT

A process is provided where a waste stream is directed to an evaporator that produces a vapor having volatile compounds. The vapor including the volatile compounds is directed through a vapor scrubber that contacts the volatile compounds with a scratching solution. The scrubbing solution reacts with the gaseous volatile compounds in the vapor such that the volatile compounds pass from a vapor state into the scrubbing solution and form volatile compounds in the liquid scrubbing solution. The scrubbing solution is collected and recycled.

17 Claims, 2 Drawing Sheets

PROCESS OF SCRUBBING VOLATILES FROM EVAPORATOR WATER VAPOR

FIELD OF INVENTION

The present invention relates to a process for treating vapor generated from a waste stream in an evaporator, and more particularly relates to removing volatile acids and/or bases from the vapor.

SUMMARY

The present invention relates to a process for treating vapor formed in an evaporator in a waste stream treatment process. The waste stream is directed to an evaporator where water from the waste stream is vaporized. As the waste stream is heated, volatile compounds in the waste stream are also vaporized. The vapor, including the volatile compounds, is directed to a vapor scrubber where the vapor is contacted with a scrubbing solution. The volatile compounds in the vapor phase react with chemicals in the scrubbing solution and pass from the vapor into the scrubbing solution. Thus, the scrubbing solution removes the volatile contaminants from the vapor.

Other objects and advantages of the present invention will become apparent and obvious from a study of the following description and the accompanying drawings which are merely illustrative of such invention.

DESCRIPTION OF EXEMPLARY EMBODIMENTS

Figure 1:
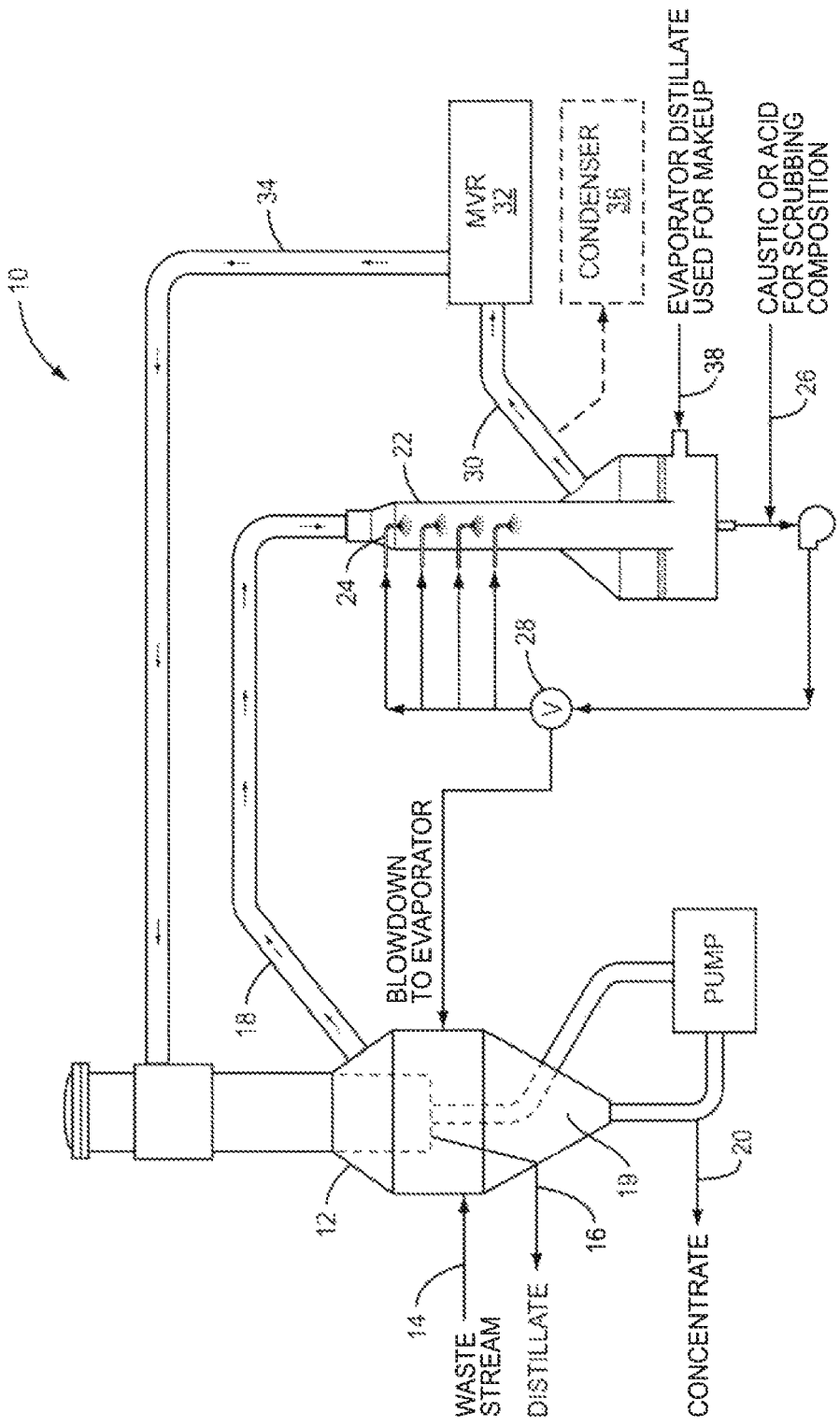
FIG. 1 is a schematic illustrating a process for treating vapor containing volatile compounds utilizing a vapor scrubber.

A system for treating vapor from a waste stream is generally indicated by the numeral 10 in FIG. 1. In the embodiment illustrated therein, vapor can be produced from various types of waste streams, including landfill leachate, flue gas desulfurization (FGD) waste streams, and integrated gasification combined cycle (IGCC) waste streams.

Viewing the vapor treatment system 10 in more detail, the waste stream influent is directed into an evaporator 12 through waste stream inlet 14. During this phase of the process, the waste stream influent is heated to produce vapor, distillate, and concentrated brine. Evaporator 12 may be any type of evaporator including falling film or forced circulation. Evaporator 12 includes distillate outlet 16, vapor outlet line 18, a sump 19 for collecting and holding a concentrated brine, and a concentrated brine outlet 20. As the water is evaporated from the waste stream in the evaporator, volatile acids and/or bases present in the waste stream also evaporate and form gaseous volatile compounds in the vapor. Thus, the evaporated volatile compounds that were present in the waste stream generally have volatilities, and thus, vapor pressures, similar to or greater than that of water.

The vapor, including the evaporated volatile compounds, is directed from evaporator 12, through the vapor outlet line 18, to vapor scrubber 22. In vapor scrubber 22, an aqueous scrubbing solution, in one embodiment, is sprayed through nozzles 24 into the vapor. The scrubbing solution includes either caustic and/or acidic compounds which react with the volatile compounds in the vapor. For example, if the scrubbing solution contains caustic compounds, the scrubbing solution will react with volatile acids in the vapor. On the other hand, if the scrubbing solution contains acidic compounds, the scrubbing solution will react with volatile bases in the vapor. In either case, the scrubbing solution reacts with the volatile compounds in the vapor to form a salt, which is removed from the vapor phase and passed into the liquid of the scrubbing solution. The salts, formed from the reaction between the volatile compounds and the scrubbing solution, are water soluble and thus, dissociate in the scrubbing solution. Other means may also be used to promote the transfer of volatile acids and/or bases from the vapor to the liquid phase. Such devices include, random or structuring packing, wire mesh pads, or various types of trays, such as sieves, bubble caps, etc. Not only does the scrubbing solution react with the volatile acids and/or bases in the vapor, but the scrubbing solution also serves to break up any foam produced in the evaporator 12 that is entrained in the vapor.

In one embodiment, the vapor includes the volatile base ammonia. That is, ammonia was present in the waste stream entering the evaporator 12. As the waste stream is heated in evaporator 12, water and ammonia in the waste stream evaporate. To remove the ammonia from the vapor, the scrubbing solution, which includes an acid, such as hydrochloric acid (HCl) or sulfuric acid ($H_2SO_4$), is sprayed into the vapor. The acid in the scrubbing solution reacts with the ammonia to produce either ammonium chloride or ammonium sulfate salt. The salt formed from these reactions, dissociates in the scrubbing solution. For example:

$$NH_3(g) + HCl(aq) \rightarrow NH_4Cl(aq)$$

$$2NH_3(g) + H_2SO_4(aq) \rightarrow (NH_4)_2SO_4(aq)$$

In another embodiment, the vapor includes formic acid ($HCO_2H$) and/or boric acid ($B(OH)_3$). That is, formic acid and/or boric acid were present in the waste stream entering evaporator 12. As the waste stream is heated in evaporator 12, water, formic acid and/or boric acid in the waste stream evaporate. To remove the volatile acids from the vapor, the scrubbing solution, which comprises an alkali, such as sodium hydroxide (NaOH) or potassium hydroxide (KOH), is sprayed into the vapor. The alkali compounds in the scrubbing solution react with the volatile acids to produce formate and/or borate salts. The salts formed from these reactions, dissociate in the scrubbing solution. For example:

$$HCO_2H(g) + NaOH(aq) \rightarrow NaHCO_2(aq) + H_2O$$

$$B(OH)_3(g) + NaOH(aq) \rightarrow NaB(OH)_4(aq)$$

$$HCO_2H(g) + KOH(aq) \rightarrow KHCO_2(aq) + H_2O$$

$$B(OH)_3(g) + KOH(aq) \rightarrow KB(OH)_4(aq)$$

Referring again to FIG. 1, the scrubbing solution is produced by adding an alkali or acid through inlet 26 to the circulating aqueous solution in the bottom portion of vapor scrubber 22. At least a portion of the scrubbing solution is then circulated toward valve 28, where it is recirculated to the spray nozzles 24 for treating the vapor. The concentration of the salts in the scrubbing solution circulated through the vapor scrubber 22 is controlled by removing a portion of the scrubbing solution as blowdown and in one embodiment directing the blowdown through valve 28 to the evaporator 12 for further treatment. In other cases, the blowdown from the vapor scrubber 22 can be directed to other treatment systems or can be disposed of in various conventional ways. For example, in a system designed for coal gasification wastewater treatment, the scrubber blowdown is directed to a separate crystallizer to precipitate out the salts formed in the scrubbing reaction.

In the embodiment illustrated in FIG. 1, after passing through the sprayed scrubbing solution, the treated vapor passes through line 30 toward a mechanical vapor recompression (MVR) device 32. In one embodiment, prior to reaching the MVR 32, the treated vapor passes through mist eliminators. MVR 32 compresses the vapor which is then directed through line 34 to evaporator 12 where it is used to heat and vaporize the incoming waste stream. As the heat from the treated vapor is transferred to the incoming waste stream, the vapor condenses and forms a distillate which exits the evaporator through outlet 16. As shown in FIG. 1, at least a portion of the distillate from evaporator 12 is directed from outlet 16 to inlet 38 of the vapor scrubber 22. The distillate is then added as make-up water to the scrubbing solution. In an alternate embodiment, a portion of the treated vapor is not directed to MVR 32, but is instead directed from the vapor scrubber 22 to condenser 36.

Figure 2:
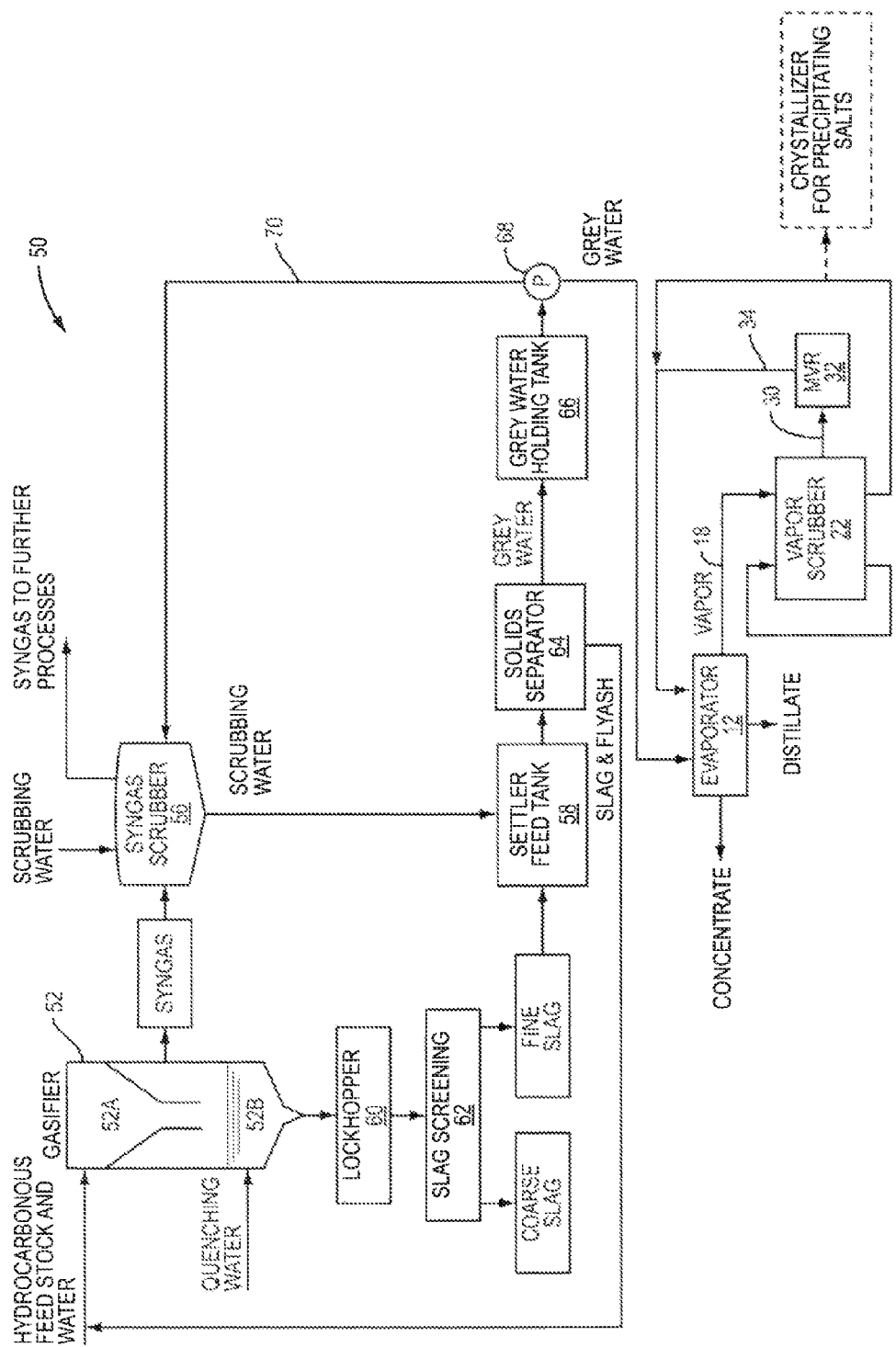
FIG. 2 is a schematic illustrating the process for treating vapor shown in FIG. 1 applied to a gasification process.

FIG. 2 is a schematic illustration of a gasification process that incorporates the system for treating a vapor stream shown in FIG. 1. The gasification system shown in FIG. 2 is indicated generally by the numeral 50. As shown therein, a feedstock such as a hydrocarbonaceous feedstock is directed into a gasifier 52. Examples of hydrocarbonaceous feedstocks are coal and petroleum coke. Typically, coal or petroleum coke is pulverized and mixed with water to form a slurry and the slurry is directed into the gasifier 52. It should be appreciated that other fuels can be utilized as a feedstock in gasification processes. For example, organic waste material including plastic waste or sewage can form a feedstock. Typical gasifiers operate at high temperatures and high pressures. For example, a typical temperature range for a gasifier is approximately 1,200° to approximately 1,500° C. A typical pressure range is from approximately 20 to approximately 80 atmospheres.

Gasifier 52 includes a reaction zone 52A and a quenching chamber 52B. The feedstock or slurry is fed into the reaction zone 52A. In the case of coal for example, the coal slurry is fed into the reaction zone 52A and is partially oxidized. This produces a hot effluent syngas and slag. Syngas basically comprises carbon monoxide and hydrogen. Quenching water is directed into the quenching chamber 52B. The raw syngas and slag byproduct pass to the quenching chamber 52B typically disposed at the lower end of the gasifier 52. Here, the hot syngas and molten slag are contacted with quenching water and are cooled and separated. The slag, entrained within the some of the quenching water, is removed from the gasifier 52. The syngas is directed to a syngas scrubber 56 which removes fine ash, soot, salts, and other suspended solids from the syngas. In particular, as illustrated in FIG. 2, scrubbing water is introduced into the scrubbing chamber 56. As a result of the scrubbing water contacting the syngas, the scrubbing water removes fine ash, soot, salts, and other suspended solids from the syngas and this results in an aqueous waste stream (blowdown) that is directed from the syngas scrubber 56 to a settler feed tank 58. After the syngas has been scrubbed in the scrubber 56, the syngas is subjected to various other treatments. For example, water in the syngas is condensed and/or removed by a water knockout. Details of the further treatment of the syngas is not dealt with herein because such is not per se material to the present invention and further processes for treating the syngas after scrubbing are well known and appreciated by those skilled in the art.

Returning to the gasifier 52, as noted above, the slag byproduct combined with some of the quenching water is directed to a lockhopper 60. Lockhopper 60 removes slag from the quenching water-slag mixture and the removed slag, along with some water, is directed to a screening system 62. Screening system 62 separates the slag into coarse slag and fine slag. The coarse slag is suitable for commercial use or can be disposed in a landfill. The fine slag is directed to the settler feed tank 58 where it mixes with the scrubbing water from the syngas scrubber 56. In some cases, the aqueous solution received and held in the settler feed tank 58 is referred to as black water. In any event, the aqueous solution in the settler feed tank 58 will include suspended solids such as slag, fly ash, etc.

The black water in the settler tank 58 is fed to the clarifier or solids separator 64 which removes substantial suspended solids including slag, fly ash, and other particulate matter. The settled suspended solids from clarifier 64 may be recirculated back to the gasifier 52 for further treatment. In addition, clarifier or solids separator 64 produces a supernatant or grey water waste stream that is directed from the clarifier 64 to a holding tank 66. A portion of the grey water held in the grey water holding tank 66 is treated by the treatment system 10 shown in FIG. 1.

One of the principal reasons for treating the grey water is that the grey water includes chloride salts that are of a concern since they are water soluble and tend to accumulate in recirculated process water. Furthermore, chloride is corrosive to material such as stainless steels, which are typically used in gasification process equipment. In partial oxidation gasification processes where coal, petroleum coke, or waste plastics and other chloro-organic materials are found in the feedstock, one of the most common chlorides exiting the gasifier is hydrogen chloride. In addition, partial oxidation reactions also produce ammonia from the feedstock. Ammonia and hydrogen chloride react in water systems to form an ammonium chloride solution. Thus, various chloride species might reside in the grey water and it is preferable to remove these corrosive species.

A stream of grey water is pumped from the grey water holding tank 66 by pump 68 to a recycle line 70. Recycle line 70 leads back to the syngas scrubber 56 where the grey water is utilized to scrub the syngas. A portion of the grey water is not recycled but is directed through the treatment system 10 shown in FIG. 1. As illustrated in FIG. 2, a portion of the grey water is directed to evaporator 12. As discussed above, evaporator 12 concentrates the waste stream and produces a vapor containing various evaporated acids and/or bases from the grey water waste stream. The vapor containing the volatile compounds is directed to the vapor scrubber 22 where it is "scrubbed" with the scrubbing solution. The volatile acids and/or bases present in the vapor react with the scrubbing solution and are removed from the vapor and dissociate as salt in the scrubbing solution. In the embodiment illustrated in FIG. 2, the blowdown from the vapor scrubber is returned to the evaporator 12 for further treatment. There are other treatments that may be appropriate for treating the blowdown from the vapor scrubber 22. For example, in a gasification process such as shown in FIG. 2, the blowdown from the vapor scrubber 22 can be directed to a separate crystallizer to precipitate out salts formed in the scrubbing reaction.

In some situations, it may be necessary or prudent to provide some additional means for removing suspended solids from the grey water prior to the grey water reaching the evaporator. That is, in some cases, there may be a significant concentration of suspended solids, particularly slag and fly ash, in the grey water effluent leaving the solids separator 64. This is especially true if there is an upset with respect to the solids separator 64. In these cases, it may be beneficial to remove these remaining suspended solids from the grey water effluent before reaching the evaporator 12. By removing slag and fly ash that might be contained in the grey water effluent, the fouling normally associated with the suspended solids in the evaporator is reduced or eliminated. Various means can be employed to remove the suspended solids prior to reaching the evaporator. One approach is to utilize a ceramic membrane or a group of ceramic membranes just upstream of the evaporator 12.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A method of treating a waste stream having volatile compounds contained therein, the method comprising:
   directing the waste stream to an evaporator;
   evaporating water and volatile compounds from the waste stream in the evaporator to form vapor which contains gaseous volatile compounds and a concentrated brine;
   directing the vapor having the gaseous volatile compounds to a vapor scrubber;
   contacting the vapor having the gaseous volatile compounds with a reactive scrubbing solution as the vapor passes through the vapor scrubber;
   reacting the scrubbing solution with the gaseous volatile compounds such that the gaseous volatile compounds pass from the vapor into the reactive scrubbing solution and form liquid volatile compounds in the scrubbing solution, wherein reacting the scrubbing solution with the gaseous volatile compounds produces a treated vapor stream; and
   collecting the scrubbing solution having the liquid volatile compounds removed from the vapor.

2. The method of claim 1 wherein the evaporator is a mechanical vapor recompression evaporator and the method further comprises directing the treated vapor stream to a mechanical vapor recompression device, compressing the treated vapor stream and recirculating the compressed treated vapor stream from the mechanical vapor recompression device to the mechanical vapor recompression evaporator and using the compressed treated vapor stream to heat the waste stream.

3. The method of claim 1 including directing at least a portion of a distillate from the evaporator to the vapor scrubber and adding the distillate to the scrubbing solution.

4. The method of claim 1 further comprising directing the scrubbing solution from the vapor scrubber to the evaporator and mixing the scrubbing solution with the concentrated brine.

5. The method of claim 1 further comprising directing the treated vapor stream to a condenser, and condensing the treated vapor stream to form a distillate.

6. The method of claim 1 further comprising collecting the scrubbing solution in a sump associated with the vapor scrubber.

7. The method of claim 1 wherein the volatile compounds include formic acid, boric acid, or ammonia.

8. The method of claim 6 wherein the scrubbing solution includes sodium hydroxide, potassium hydroxide, sulfuric acid, or hydrochloric acid.

9. The method of claim 1 including condensing the treated vapor stream to form a distillate and mixing at least some of the distillate with the scrubbing solution that is collected in a sump associated with the vapor scrubber.

10. The method of claim 1 wherein the scrubbing solution including the volatile compounds is collected in a sump associated with the vapor scrubber, and the method includes splitting the collected scrubbing solution into first and second portions and recycling the first portion of the collected scrubbing solution to the vapor scrubber and contacting the vapor with the first portion of the collected scrubbing solution, and directing the second portion of the collected scrubbing solution to the evaporator for further treatment.

11. The method of claim 1 wherein the scrubbing solution includes a caustic or an acid for reacting with a gaseous volatile compounds in the vapor.

12. The method of claim 1 wherein the vapor includes formic or boric acid and the method includes contacting the formic or boric acid with an alkali contained in the scrubbing solution.

13. The method of claim 1 wherein the vapor includes ammonia and the method includes contacting the ammonia with an acid contained in the scrubbing solution.

14. The method of claim 13 wherein the acid contained within the scrubbing solution is hydrochloric acid or sulfuric acid.

15. The method of claim 1 wherein the scrubbing solution includes a reagent that reacts with gaseous volatile compounds to form salts that disassociate in the scrubbing solution.

16. The method of claim 1 further including utilizing the vapor scrubber to break up foam contained in the vapor.

17. The method of claim 1 further comprising directing the treated vapor stream to a condenser or another evaporator.

* * * * *